United States Patent [19]
Kuhn et al.
[11] 3,998,862
[45] Dec. 21, 1976

[54] ALKYL AMMONIUM CARBOXYLITE SALT-ETHOXYLATED ALKYL PHENOL ESTERS

[75] Inventors: Robert R. Kuhn, Lansdale; Warren H. Machleder, Bluebell, both of Pa.

[73] Assignee: Rohm and Haas Company, Philadelphia, Pa.

[22] Filed: Mar. 11, 1975

[21] Appl. No.: 557,435

Related U.S. Application Data

[63] Continuation of Ser. No. 379,670, July 16, 1973, Pat. No. 3,912,771.

[52] U.S. Cl. .............................. 260/404.5; 260/404

[51] Int. Cl.[2] ...................... C09F 5/00; C09F 7/00; C11C 3/00

[58] Field of Search ......................... 260/404, 404.5

[56] References Cited

UNITED STATES PATENTS

| | | | |
|---|---|---|---|
| 2,386,446 | 10/1945 | DeGroote | 260/404 X |
| 2,911,368 | 11/1959 | Fowler | 252/34 |
| 2,973,382 | 2/1961 | Dreher | 260/404 |
| 2,976,179 | 3/1961 | Weiland | 260/404.5 X |
| 3,017,360 | 1/1962 | Cyba | 260/404.5 X |
| 3,328,409 | 6/1967 | Wakeman | 260/404.5 X |
| 3,377,382 | 4/1968 | Elmquist | 260/404 X |
| 3,702,300 | 11/1972 | Coleman | 252/51.5 A |

*Primary Examiner*—Winston A. Douglas
*Assistant Examiner*—John F. Niebling

[57] ABSTRACT

A new class of compounds having rust inhibiting and/or corrosion protecting properties is disclosed and claimed. The compounds (or mixtures thereof) are especially useful as rust inhibitors and for corrosion protection in hydrocarbon fuel or oil compositions, such as in gasoline, diesel and home heating fuels, industrial oils and lubricating oils, and such fuel and oil compositions incorporating the novel compounds are also disclosed and claimed. In a preferred embodiment the compounds are alkyl ammonium carboxylate salt-ethoxylated alkyl phenol esters of a trimer of dimer acid (or mixture thereof).

6 Claims, No Drawings

ALKYL AMMONIUM CARBOXYLITE SALT-ETHOXYLATED ALKYL PHENOL ESTERS

This is a continuation, of application Ser. No. 379,670 filed July 16, 1973 now U.S. Pat. No. 3,912,771.

This invention relates to a novel class of compounds having rust inhibiting and/or corrosion protecting properties and to hydrocarbon mixtures or compositions containing one or more of said compounds. The novel compounds are, generically, alkyl ammonium carboxylate salt-ethoxylated alkyl phenol esters of a polycarboxylic acid having at least two (2) carboxyl groups and wherein the polycarboxylic acid is preferably a trimer or dimer acid (or mixture thereof), as more fully described hereinafter. The polycarboxylic acid is typically a polymerization product of a $C_{16}$–$C_{18}$ unsaturated or hydroxy substituted aliphatic $C_{16}$ to $C_{18}$ monocarboxylic acid. The polycarboxylic acid product may contain individual polycarboxylic acids with up to 5 or more carboxylic acid groups, but the polycarboxylic acid product itself will have an average number of acid groups or an average acid functionality in the range of about 1.9 to 3.5 and more preferably in the range of about 2 to 3. (In the case of a pure trimer acid, the acid functionality is 3, and in the case of pure dimer acid, the acid functionality is 2).

The novel salt-ester materials of the present invention should have a ratio (on a molar basis) of amine salt (or alkyl ammonium) functionality to ester functionality in the range of about 1 to 4 to about 4 to 1, and more preferably about 1 to 2 to about 2 to 1.

In the case of an alkyl ammonium carboxylate salt-ethoxylated alkyl phenol ester of a trimer or dimer acid (or mixture thereof) the product may be represented by the following general formula (I):

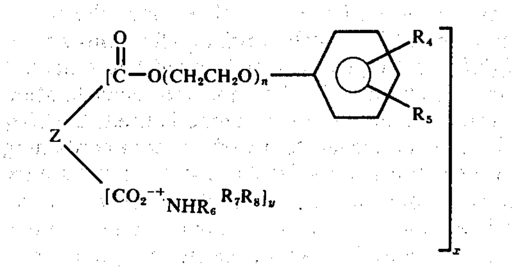

(I)

where $n$ is an average number from about 1 to 12.5 and more preferably from about 1 to 5; and in the case of a salt-ester derived from a trimer acid $x$ is an average number of from 1 to 2

$y$ is an average number of from 1 to 2, the sum of $x$ and $y$ being 3;

and in the case of the salt-ester derived from a dimer acid, both $x$ and $y$ are each on the average 1 (or an average number of 1);

$R_4$ is an alkyl group containing 4 to 12 carbon atoms;

$R_5$ is H or an alkyl group containing 4 to 12 carbon atoms;

$R_6$ is an alkyl group containing 1 to 24 carbon atoms which may be straight or branched chain or an amine substituted alkyl group of 2 to 24 carbon atoms. Preferably, $R_6$ contains 12 to 22 carbon atoms; $R_7$ is defined the same as $R_6$ or it may be H, $R_8$ is defined the same as $R_6$ or it may be H; and Z is a saturated or unsaturated hydrocarbon residue of the acid, said hydrocarbon residue having about 34 to 51 carbon atoms. (Z will ordinarily have 51 carbon atoms in the case of a trimer acid, and ordinarily 34 carbon atoms in the case of a dimer acid); and the ratio of $y$ to $x$ is a number in the range of about 1 to 2 to 2 to 1.

The alkyl ammonium carboxylate salt-ester rust inhibitor or corrosion protector may be used as all trimer acid derivative or all dimer acid derivative, or any mixture of the dimer and trimer or higher acid derivatives may be used in the present invention.

Also, the presence of some monocarboxylic $C_{18}$ acids or the like in the ester or salt form, or mixtures of both ester and salt form, may be tolerated in minor amounts about 10% or less.

Specific representative embodiments of the alkyl ammonium carboxylate salt-ester of the present invention (and of the general formula I, above,) and wherein, $R_4$ is substantially or essentially all octyl, i.e., $-C_8H_{17}$, and $R_5$ is H, $R_7$ is H and $R_8$ is H, and which form a part of the present invention are given in Table I below:

TABLE I

| Alkyl Ammonium Carboxylate Salt-Ester | n | $R_6$ | Ratio y/x | X | Y |
|---|---|---|---|---|---|
| A | 1.5 | t-$C_{12-14}$ | 2 | 1 | 2 |
| B | 1.5 | t-$C_{12-14}$ | 1/2 | 2 | 1 |
| C | 3 | t-$C_{12-14}$ | 2 | 1 | 2 |
| D | 3 | t-$C_{12-14}$ | 1/2 | 2 | 1 |
| E | 5 | t-$C_{12-14}$ | 2 | 1 | 2 |
| F | 7.5 | t-$C_{12-14}$ | 2 | 1 | 2 |
| G | 9.5 | t-$C_{12-14}$ | 2 | 1 | 2 |
| H | 9.5 | t-$C_{12-14}$ | 1/2 | 2 | 1 |
| I | 12.5 | t-$C_{12-14}$ | 2 | 1 | 2 |
| J | 3 | $CH_2CH_2NH_2$ | 1/2 | 2 | 1 |
| K | 3 | $(CH_2CH_2NH)_2H$ | 1/2 | 2 | 1 |
| L | 3 | $(CH_2CH_2NH)_3H$ | 1/2 | 2 | 1 |
| M | 1.5 | t-$C_{12-14}$ | 1 | 1 | 1 |
| N | 3 | t-$C_{12-14}$ | 1 | 1 | 1 |
| O | 9.5 | t-$C_{12-14}$ | 1 | 1 | 1 |
| P | 3 | t-$C_{18-22}$ | 1 | 1 | 1 |
| Q | 3 | t-$C_{18-22}$ | 1/2 | 2 | 1 |
| R | 3 | t-$C_{18-22}$ | 2 | 1 | 2 |
| S | 5 | t-$C_{12-14}$ | 1 | 1 | 1 |
| T | 1.5 | t-$C_{18-22}$ | 1 | 1 | 1 |
| U | 5 | t-$C_{18-22}$ | 1 | 1 | 1 |
| V | 5 | t-$C_{12-14}$ | 1/2 | 2 | 1 |
| W | 7.5 | t-$C_{12-14}$ | 1/2 | 2 | 1 |
| X | 10 | t-$C_{12-14}$ | 1/2 | 2 | 1 |
| Y | 1.5 | t-$C_{18-22}$ | 1/2 | 2 | 1 |
| Z | 5 | t-$C_{18-22}$ | 1/2 | 2 | 1 |
| A' | 1 | t-$C_{12-14}$ | 2 | 1 | 2 |
| B' | 10 | t-$C_{12-14}$ | 2 | 1 | 2 |
| C' | 1 | t-$C_{18-22}$ | 2 | 1 | 2 |
| D' | 5 | t-$C_{18-22}$ | 2 | 1 | 2 |

The alkyl ammonium carboxylate salt-ester can be made in known fashion, by the acid catalyzed esterification of a suitable dimer or trimer acid, or mixture thereof, for example, in the case of the diester-monosalt, with two moles of a suitable ethoxylated alkyl phenol, followed by conversion of the remaining carboxylic acid functionality to an alkyl ammonium carboxylate salt with the addition of a suitable amine. The esterification reaction is ordinarily carried out in a temperature range of about 100° to 200° C., and more preferably in the range of about 130° to 170° C. Concentrated $H_2SO_4$ is a typical catalyst. The salt formation takes place readily at room temperature, or at higher temperatures if desired. The trimer acid may be the product derived from the trimerization reaction of a $C_{18}$ unsaturated fatty acid; an example of a suitable trimer acid is that available under the trademark Empol 1041. The preparation of such dimer and trimer acids is described in U.S. Pat. No. 2,632,695. A generalized reaction scheme for the preparation of an alkyl ammonium carboxylate salt-ester is shown below using a trimer acid for illustrative purposes:

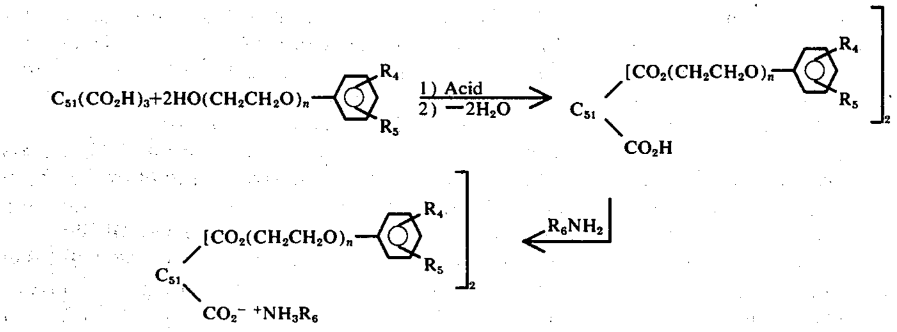

where $n$, $R_4$, $R_5$, and $R_6$ have the values given previously, and $C_{51}$ is the carbon atom content of the hydrocarbon residue.

The amines which are used in the preparation of the alkyl ammonium salt-esters may contain primary, secondary or tertiary nitrogen and the alkyl groups may have straight or branched chains and $R_6$ will usually contain about 1 to 24, preferably 8 to 24, carbon atoms, and $R_7$ and $R_8$ may be H or contain 1 to 24 carbon atoms, but are preferably H or contain 1 to 4 carbon atoms. These amines may be represented by the general formula (II)

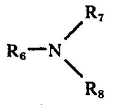
(II)

A particular embodiment includes the tertiary (tert.) or t-alkyl primary amine, having at least one branched chain and which can be used to form the salt-esters, may be represented by the general formula (III).

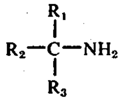
(III)

in which $R_1$, $R_2$ and $R_3$ are alkyl groups whose total carbon atom content ranges from 6 to 24. It is preferred that two of the R groups, for example, the $R_1$ and $R_3$ of the t-alkyl primary amine be methyl groups.

The t-alkyl primary amines, having a branched chain, which may be used in the compositions of the present invention include, for example, t-octylamine, t-nonylamine, t-dodecylamine, t-tetradecylamine, t-octadecylamine, t-docosylamine, t-tetracosylamine and mixtures of two or more of such amines. These amines are commonly prepared by reactions known to those skilled in the art such as the reaction of nitriles with alkenes or secondary or tertiary alcohols in strongly acidic media. Commercially available t-alkyl primary amines are often mixtures. t-Octylamine having a branched structure has the formula

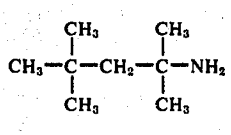

and the alkyl group of this amine will hereinafter be referred to as t-octyl. One form of t-nonylamine is prepared as a mixture containing $C_6H_{13}C(CH_3)_2NH_2$ and $C_7H_{15}C(CH_3)_2NH_2$ and has a neutral equivalent of about 142. A commercial preparation which is useful in the present invention is available under the trademark Primene 81-R which is a mixture of t-dodecyl-, t-tridecyl- and t-tetradecylamines or principally a mixture of t-$C_{12}H_{25}NH_2$ to t-$C_{14}H_{29}NH_2$ amines having a neutral equivalent of about 191. Another commercial preparation which is useful in the present invention is available under the trademark Primene JM-T which is principally a mixture of t-$C_{18}H_{37}NH_2$ to t-$C_{22}H_{45}NH_2$ and which has a neutral equivalent of about 315. The important consideration is that when a t-alkyl primary amine is used, the $NH_2$ group is always attached to a carbon atom containing no hydrogen atoms and at least one of the alkyl groups is branched. Some straight chained amines which can be used are butylamine, decylamine, dodecylamine, tridecylamine, tetradecylamine, hexadecylamine, octadecylamine.

The dimer and trimer acids are known materials and can be prepared in known fashion. For example, an unsaturated aliphatic monocarboxylic acid having between about 16 and 18 carbon atoms per molecule, for example, linoleic acid can be polymerized or condensed to form essentially the dimer of linoleic acid, a dicarboxylic acid, and also the aliphatic monocarboxylic acid can be polymerized to form essentially the trimer of linoleic acid, a tricarboxylic acid. Mixtures of such dicarboxylic and tricarboxylic acids may also be formed. Similarly, other $C_{16}$ and $C_{18}$ unsaturated aliphatic monocarboxylic acids, including ricinoleic and linoleic acid can be polymerized to dimer and trimer acids or mixtures of such dimer and trimer acids. The preparation of such dimer and trimer acids is described in U.S. Pat. No. 2,632,695.

In an example of the preparation of a mono-salt i.e., mono-tertiary $C_{12}$–$C_{14}$ alkyl ammonium salt-diester, i.e., di(octyl ethoxylated phenol, containing about 3 moles ethylene oxide)ester of a trimer acid is prepared as follows.

EXAMPLE 1

A 200 ml. two-necked round bottom flask fitted with a Dean-Stark water trap, a magnetic stirrer and a thermometer was charged with 7 ml. of toluene, 40.0 g. of octyl ethoxylated phenol, containing about 3 moles condensed ethylene oxide, M.W. = 338 ($HO(CH_2CH_2O)_3$—  —$C_8H_{17}$) 50.0 g. of Trimer Acid, about 90% of the formula $C_{51}(CO_2H)_3$, m.w. about 845, and 0.02 g. of concentrated sulfuric acid. The reaction solution was heated to reflux with the pot temperature in the range of 150°–160° C. After refluxing for 3 hours with 1.8 ml. of water had collected (theory = 2.1 ml.). The reaction solution was then allowed to cool to ~70° C. at which point 11.8 g. of a t-alkyl amine, $NH_2$-$C_{12-14}H_{25-29}$ of M.W. of about 200 was added over a 5 minute period. When addition was complete, the reaction solution was stirred for one hour to insure homogeneity. A stripped sample of the mono-salt, di-ester had an acid number = 16.5; % $N_B$ = 0.77.

In an example of the preparation of a di-salt, i.e., di-(tertiary $C_{12}$–$C_{14}$ alkyl ammonium carboxylate salt) monoester, i.e., mono-octyl ethoxylated phenol, containing about 3 moles ethylene oxide, ester of a trimer acid is prepared as follows.

EXAMPLE 2

A 1-liter, 3-necked round bottom flask fitted with a Dean-Stark water trap, a mechanical stirrer and a thermometer was charged with 50 ml of toluene, 250.0 g. of trimer acid, (the same as described above in Example 1), 100.0 g. of ethoxylated octyl phenol (the same as described above in Example 1) and 0.1 g. of concentrated sulfuric acid. After refluxing at 133° C. for 2 hours 5.5 ml of water had collected (theory = 5.4 ml). The reaction solution was allowed to cool to ~70° C. at which point 118.0 g. of a t-allyl amine, (the same as described above in Example 1) was added over a 30 minute period. When addition was complete the reaction solution was maintained at 70° C. for 1 hour with stirring to insure homogeneity. The ester/disalt was stripped by flash evaporation to give a product having: acid No. = 55.7, 54.5; % $N_B$ = 1.78, 1.77.

To demonstrate the usefulness of the alkyl ammonium carboxylate salt-ethoxylated alkyl phenol esters, various compounds were tested for rust prevention and/or corrosion protection in various hydrocarbon mixtures according to the following methods. Results are shown in Tables II and III.

A. Rusting Test Method (See Table II)

The method for evaluating rust-inhibitor additives for use in hydrocarbon fuels inhibition is the military specification MIL-I-25017C, (Section 4.6.3). This procedure which utilizes a type B medium hard water is a modification of the basic ASTM method D665. The object of the test is to evaluate the ability of a gasoline additive to inhibit rusting of ferrous parts such as encountered in gasoline storage and transportation systems. The method involves stirring a mixture of 300 ml. of an additive blend in depolarized isooctane with 30 ml. of de-ionized-distilled water, medium hard water, or synthetic sea-water, for 5 hours at a temperature of 100° F. (37.8° C) with a cylindrical steel specimen completely immersed therein. Test results are reported as percent area rusted and a pitting rating is also optionally reported on a scale of 1 to 3, with 3 being the worst degree of pitting and 0 being the best. The type B medium hard water is prepared as follows:

3 stock solutions using ACS reagent-grade chemicals in distilled water containing, respectively, 16.4 g/liter $NaHCO_3$, 13.2 g/liter $CaCl_2.2H_2O$, and 8.2 g/liter $MgSO_4.7H_2O$. Ten ml. of the $NaHCO_3$ stock solution are pipetted into 800 ml. of distilled water in a 1-liter volumetric flask, and then shaken vigorously. While swirling the contents of the flask, 10 ml. of the $CaCl_2$ stock solution are pipetted into the flask and then 10 ml. of the $MgSO_4$ stock solution are also pipetted into the flask, distilled water is then added to bring the volume to 1 liter and mixed thoroughly. The final blend should be clear and free of precipitate.

The preparation of the synthetic sea water is described in ASTM D665, Procedure B, which is incorporated herein by reference.

B. Rusting Test Method (See Table III)

The method used for evaulating rust inhibitor additives for use in industrial hydrocarbon oils and hydrocarbon lubricants is described in ASTM D665, designation 135/64, see pages 235 to 242 of 1972 Annual Book of ASTM Standards, Part 17 (Nov.).

TABLE II

MIL-I-25017C Rust Inhibition Test

| Sample * | Treating Level In Depolarized Isooctane PPM | (%) | % Area Rusted Type B Medium Hard Water | Synthetic Sea Water |
|---|---|---|---|---|
| Isooctane Control | — | | 100 | 100 |
| N | 30 | (0.003) | 0 | — |
| P | 25 | (0.0025) | 3 | — |
| U | 15 | (0.0015) | — | 5 |
| D | 50 | (0.0050) | 3 | — |
| | 35 | (0.0035) | 10 | — |
| V | 30 | (0.0030) | — | 2 |
| Q | 35 | (0.0035) | <1 | — |
| Z | 30 | (0.0030) | — | <1 |
| C | 20 | (0.0020) | 0 | — |
| | 15 | (0.0015) | 3 | 5 |
| C' | 15 | (0.0015) | — | 1 |
| R | 25 | (0.0025) | <1 | — |
| | 15 | (0.0015) | 3 | 2 |
| D' | 15 | (0.0015) | — | 1 |

*The sample being tested and identified in the above Table II by letter designation can be further identified by reference to Table I, supra.

TABLE III

ASTM D665 Rust Inhibition Test

| Sample * | Treating Level Weight Percent in 100 Neutral Oil' | % Area Rusted Procedure A[2] | Procedure B[3] | Modified Procedure B |
|---|---|---|---|---|
| Oil Control | — | 85 | 100 | 100 |
| D | 0.01 | <1 | — | — |
| | 0.1 | — | 15 | 50 |
| | 0.2 | — | — | 5 |
| | 0.5 | — | — | <1 |
| C | 0.005 | <1 | — | — |
| | 0.2 | | | |
| A' | 0.005 | 3 | — | — |
| | 0.2 | | | |

TABLE III-continued

| | ASTM D665 Rust Inhibition Test | | | |
|---|---|---|---|---|
| | Treating Level | % Area Rusted | | |
| Sample * | Weight Percent in 100 Neutral Oil[1] | Procedure A[2] | Procedure B[3] | Modified Procedure B |
| E | 0.005 | <1 | — | — |
| | 0.2 | | | |
| C' | 0.005 | 0 | — | — |
| | 0.2 | | | |
| R | 0.005 | 2 | — | — |
| | 0.2 | | | |
| D' | 0.005 | <1 | — | — |
| | 0.2 | | | |

1. Mid continent solvent refined 100 neutral oil
2. Distilled water, 140° F., 24 hours
3. Synthetic sea water, 140° F., 24 hours
4. Synthetic sea water, 180° F., 24 hours

*The sample being tested (as noted in the footnote to Table II) and identified by letter designation is the same as or can be identified by reference to Table I, supra.

As can be seen from Tables II and III, the novel salt-esters are very effective rust inhibitors, even in very small amounts, as evidenced by the small area that rusts on the specimens.

Examples of hydrocarbon products in which these rust inhibitors might be useful include:

1. Crude oil
2. Fuels such as gasoline; kerosene, No. 2 distillate, No. 4, 5, or 6 fuels including residual oils, and Bunker C fuel oil,
3. lubricants such as crankcase oils, automatic transmission fluids, slushing compounds, turbine oils, hydraulic fluids including either mineral oil-base or oil-in-water and water-in-oil emulsions, cutting oils, gear oils and greases.

The rust inhibitor or corrosion protector should be used in an amount which is effective to inhibit rust formation. Ordinarily, this will be a minor amount and will vary considerably depending upon the fuel or oil in which the rust inhibitor is used. The amount will also depend somewhat on several factors, such as temperature conditions, humidity conditions, etc., which may prevail in the surrounding environment or climate in which the fuel or oil is used or transported or stored. Ordinarily, the amount will vary from about 0.0001 to about 5% or about 1 part per million to about 50,000 parts per million. More preferably, this amount will vary from about 0.0005 to 2 or 3% or about 5 ppm to about 20,000 or 30,000 ppm. Still more preferably the amount of rust inhibitor used in the fuel or oil will vary from a minimum in the range of about 0.0015 to 0.0035% up to a maximum of about 2 or 3%. In the case of fuels, an amount of about 1 to 1000 ppm would ordinarily be sufficient, for example, in the case of gasoline. More preferably, in the case of gasoline, about 5 to 100 ppm would be sufficient. In the case of hydraulic fluids and industrial fluids and general lubricants, this amount would ordinarily range to a greater amount, depending upon the conditions as noted above. In the case of cutting oils, in particular, relatively large amounts of rust inhibitor may be used; but as noted above, the amount will vary from about 0.005 to about 5% and more preferably from about 0.0025 to about 2 or 3%.

In the examples and in the specification and claims, all parts and percentages are by weight unless otherwise stated.

We claim:

1. As a new composition of matter, surface active alkyl ammonium carboxylate salt-ethoxylated alkyl phenol ester of a trimer or dimer acid of the formula

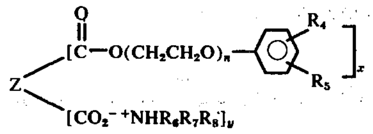

where $n$ is an average number from about 1 to 12.5; and wherein in the case of the salt-ester derived from a trimer acid $x$ is an average number of from about 1 to 2, and $y$ is an average number of from about 1 to 2, the sum of $x$ and $y$ being 3;

and in the case of the salt-ester derived from a dimer acid, both $x$ and $y$ are each on the average 1, the sum of $x$ and $y$ being 2;

$R_4$ is an alkyl group containing 4 to 12 carbon atoms;

$R_5$ is H or an alkyl group containing 4 to 12 carbon atoms;

$R_6$ is an alkyl group containing 1 to 24 carbon atoms which may be straight or branched chain or an amine substituted alkyl group of 2 to 24 carbon atoms; $R_7$ is H or is the same as $R_6$, $R_8$ is H or is the same as $R_6$; and Z is a saturated or unsaturated hydrocarbon residue of the acid, said hydrocarbon residue having 34 to 51 carbon atoms.

2. Composition according to claim 1 wherein the acid is a trimer acid and Z is a hydrocarbon residue having 51 carbon atoms, $n$ is 3, $R_4$ is octyl, $R_5$ is H, $R_6$ is a t-alkyl amine having a carbon atom content of about 18 to 22 carbon atoms, $R_7$ and $R_8$ are each H, and $x$ is 1 and $y$ is 2.

3. Composition according to claim 1 wherein the acid is a trimer acid and Z is a hydrocarbon residue having 51 carbon atoms, $n$ is 3, $R_4$ is octyl, $R_5$ is H, $R_6$ is a t-alkyl amine having a carbon atom content of about 18 to 22 carbon atoms, $R_7$ and $R_8$ are each H, and $x$ is 2 and $y$ is 1.

4. Composition according to claim 1 wherein the acid is a trimer acid and Z is a hydrocarbon residue having 51 carbon atoms, $n$ is 3, $R_4$ is octyl, $R_5$ is H, $R_6$ is a t-alkyl amine having a carbon atom content of about 12 to 14 carbon atoms, $R_7$ and $R_8$ are each H, and $x$ is 1 and $y$ is 2.

5. Composition according to claim 1 wherein the acid is a trimer acid and Z is a hydrocarbon residue having 51 carbon atoms, $n$ is 3, $R_4$ is octyl, $R_5$ is H, $R_6$ is a t-alkyl amine having a carbon atom content of about 12 to 14 carbon atoms, $R_7$ and $R_8$ are each H, and $x$ is 2 and $y$ is 1.

6. Composition according to claim 1 wherein the acid is a dimer acid and Z is a hydrocarbon residue having 34 carbon atoms, $n$ is 3, $R_4$ is octyl, $R_5$ is H, $R_6$ is a t-alkyl amine having a carbon atom content of about 18 to 22 carbon atoms, $R_7$ and $R_8$ are each H, and $x$ and $y$ are each 1.

* * * * *

Disclaimer 3,998,862.—*Robert R. Kuhn*, Lansdale, and *Warren H. Machleder*, Bluebell, Pa. ALKYL AMMONIUM CARBOXYLITE SALT-ETHOXYLATED ALKYL PHENOL ESTERS. Patent dated Dec. 21, 1976. Disclaimer filed Mar. 9, 1977, by the assignee, *Rohm and Haas Company*.

Hereby enters this disclaimer to claims 1–6 of said patent.

[*Official Gazette May 3, 1977.*]